(12) United States Patent
Berzon

(10) Patent No.: US 7,767,304 B2
(45) Date of Patent: Aug. 3, 2010

(54) POLARIZED ARTICLES AND METHODS FOR OBTAINING POLARIZED ARTICLES

(75) Inventor: Ronald A. Berzon, St. Petersburg, FL (US)

(73) Assignee: Essilor International Compagnie Generale d'Optique, Charenton-Le-Pont (FR)

( * ) Notice: Subject to any disclaimer, the term of this patent is extended or adjusted under 35 U.S.C. 154(b) by 911 days.

(21) Appl. No.: 10/529,054

(22) PCT Filed: Jan. 28, 2005

(86) PCT No.: PCT/EP2005/001053

§ 371 (c)(1),
(2), (4) Date: Apr. 13, 2006

(87) PCT Pub. No.: WO2005/075533

PCT Pub. Date: Aug. 18, 2005

(65) Prior Publication Data

US 2007/0098999 A1  May 3, 2007

Related U.S. Application Data

(60) Provisional application No. 60/540,423, filed on Jan. 30, 2004.

(51) Int. Cl.
*B29D 11/00* (2006.01)
*C08F 5/00* (2006.01)
*B32B 27/40* (2006.01)

(52) U.S. Cl. .................... 428/424.2; 428/500; 359/642; 264/1.7; 264/331.19

(58) Field of Classification Search ............. 428/424.2, 428/500; 359/642; 264/1.7, 331.19
See application file for complete search history.

(56) References Cited

U.S. PATENT DOCUMENTS

| | | | |
|---|---|---|---|
| 2,237,567 A | 4/1941 | Land | 88/65 |
| 4,090,830 A | 5/1978 | Laliberte | 425/117 |
| 4,689,387 A | 8/1987 | Kajimoto et al. | 528/76 |
| 4,775,733 A | 10/1988 | Kanemura et al. | 528/67 |
| 5,087,758 A | 2/1992 | Kanemura et al. | 568/57 |
| 5,191,055 A | 3/1993 | Kanemura et al. | 528/77 |
| 5,608,115 A | 3/1997 | Okazaki et al. | 568/61 |
| 5,837,797 A | 11/1998 | Okazaki et al. | 528/76 |
| 6,113,811 A | 9/2000 | Kausch et al. | 252/585 |
| 6,177,032 B1 | 1/2001 | Smith et al. | 264/1.34 |
| 6,220,703 B1 | 4/2001 | Evans et al. | 351/163 |
| 6,235,396 B1 | 5/2001 | Dixon | 428/412 |
| 6,432,327 B2 | 8/2002 | Beeloo et al. | 264/1.34 |
| 6,887,401 B2 * | 5/2005 | Keita et al. | 264/1.1 |
| 7,318,960 B2 * | 1/2008 | Yamamoto et al. | 428/474.4 |
| 2007/0058253 A1 | 3/2007 | Aiiso et al. | 359/487 |

FOREIGN PATENT DOCUMENTS

WO    WO 02/073291    9/2002

* cited by examiner

*Primary Examiner*—Thao T. Tran
(74) *Attorney, Agent, or Firm*—Fulbright & Jaworski L.L.P.

(57) ABSTRACT

Processes suitable for creating polarized articles using polyvinyl alcohol films, and articles produced by those processes.

22 Claims, No Drawings

POLARIZED ARTICLES AND METHODS FOR OBTAINING POLARIZED ARTICLES

This application is a national phase application under 35 U.S.C. §371 of International Application No. PCT/EP2005/001053 filed 28 Jan. 2005, which claims priority to U.S. Provisional Application No. 60/540,423 filed 30 Jan. 2004. The entire text of each of the above-referenced disclosures is specifically incorporated by reference herein without disclaimer.

BACKGROUND OF THE INVENTION

1. Field of the Invention

The invention relates generally to processes for obtaining polarized articles. More particularly, certain of the articles may be optical lenses, and a polarized polyvinyl alcohol film may be used.

2. Description of Related Art

Most ophthalmic lenses sold today are plastic. During the manufacturing of a plastic lens, it is desirable to incorporate a polarizing film that will eliminate glare. Several types of polarizing films are used. One such type is polyvinyl alcohol (PVOH) that is stretched, aligning the molecules in one direction, and then dipped into iodine (see U.S. Pat. No. 2,237,567, incorporated by reference). Such films and others (see U.S. Pat. No. 6,113,811, incorporated by reference) are known to those of ordinary skill in the art. Dichroic dyes also are used, as are other film materials such as polyethylene terephthalate (PET) (see U.S. Pat. No. 6,432,327, incorporated by reference).

Typically, polarized films are treated with an adhesive material (see U.S. Pat. No. 6,220,703, incorporated by reference) and placed into a casting cell; a liquid monomer is introduced into the casting cell and the monomer is cured, encapsulating the film. Other methods also exist where the film can be directly laminated onto the front surface of a lens (U.S. Pat. No. 6,177,032, incorporated by reference), or between two lenses.

A polarizer also can be laminated onto a support or laminated between two supports. The supports are typically cellulose acetate butyrate (CAB) or cellulose triacetate (CTA). Adhesion of the polarizer is critical in performance, functionality and quality. U.S. Pat. No. 6,235,396 (incorporated by reference) describes an adhesive composition. A PVOH polarizer is typically treated with an adhesive agent prior to internal casting with CR39®, otherwise, no adhesion would exist.

One problem with PVOH polarized films is that they absorb water, and bubbles will result from the interaction of the moisture with the isocyanate during the casting of the poly(thio)urethane lenses, the following reactions being involved:

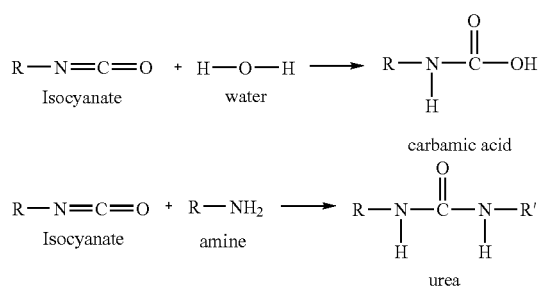

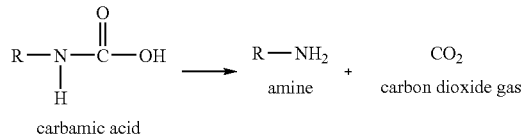

SUMMARY OF THE INVENTION

It is possible with certain of the present processes to manufacture a polythiourethane article, such as an optical lens suited for use as eyewear, with a polarizing polyvinyl alcohol (PVH) film. Such a lens has good optical qualities. Such a lens also may be free of bubbles detectable by the naked eye. There also may be no delamination of the film. Certain of the present articles include such a lens.

DESCRIPTION OF ILLUSTRATIVE EMBODIMENTS

The terms "comprise" (and any form of comprise, such as "comprises" and "comprising"), "have" (and any form of have, such as "has" and "having"), and "include" (and any form of include, such as "includes" and "including") are open-ended linking verbs. As a result, a process, a step in a process, or an article that "comprises," "has," or "includes" one or more steps or elements possesses those one or more steps or elements, but is not limited to possessing only those one or more steps or elements.

In certain embodiments, the present processes include a process for obtaining a polythiourethane polarized article. The process includes positioning a polarized polyvinyl alcohol film in a molding cavity of a two part mold assembly. The process also includes pouring in the molding cavity a polymerizable composition. The process may also include curing the polymerizable composition; and removing the polythiourethane polarized article from the molding cavity. The recovered article may have the polyvinyl alcohol film adhering to polythiourethane.

The polymerizable composition is preferably a mixture of two monomer, and preferably does not comprise oligomeric or polymeric species. The polymerizable composition especially does not comprise polythiourethane prepolymers.

The polymerizable composition may include at least one poly(iso)thiocyanate monomer and at least one polythiol. In such embodiments, the poly(iso)thiocyanate monomer may be an isocyanate monomer with two or more isocyanate groups, preferably two. The polythiol may be a monomer having two or more thiol groups, preferably three.

It is particularly surprising to notice that it is possible to obtain a polarized article comprising a polyvinyl alcohol film, especially a polarized lens, that is free of bubbles detectable by the naked eye when using as a starting polythiourethane composition a polymerizable composition comprising polyisocyanate monomers that are very sensitive to humidity, and polythiol monomers.

As an alternative to at least one poly(iso)thiocyanate monomer and at least one polythiol, the polymerizable composition may include a mixture of at least one liquid NCO- or NCS-terminated poly(thio)urethane prepolymer and at least one liquid SH-terminated poly(thio)urethane prepolymer.

Preferred polyisocyanate monomers and polythiol monomers that are useful may be chosen from those that are described in the following U.S. patents: U.S. Pat. Nos. 4,689, 387; 4,775,733; 5,191,055; 5,087,758; 5,837,797 and 5,608,115, each of which is incorporated by reference.

The iso(thio)cyanate monomers useful in the process of the present invention can be any iso(thio)cyanate compound having at least one —NCX group, where X is O or S, preferably O and at least another reactive group capable to react with a OH or SH group.

Preferably, the iso(thio)cyanate monomer comprises two or more NCX groups, and most preferably two NCX groups. The most preferred iso(thio)cyanates are diisothiocyanates.

The preferred polyisocyanate or isothiocyanate monomers are those having the formulae:

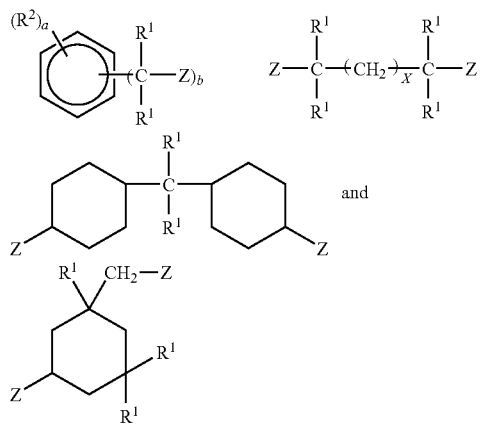

wherein
R$^1$ is independently H or a C$_1$-C$_5$ alkyl group, preferably CH$_3$ or C$_2$H$_5$;
R$^2$ is H, an halogen, preferably Cl or Br, or a C$_1$-C$_5$ alkyl group, preferably CH$_3$ or C$_2$H$_5$;
Z is —N═C═X, with X being O or S, preferably O;
a is an integer ranging from 1 to 4, b is an integer ranging from 2 to 4 and a+b≦6; and
x is an integer from 1 to 10, preferably 1 to 6.

Among the preferred polyisocyanate or isothiocyanate monomers there may be cited tolylene diisocyanate or diisothiocyanate, phenylene diisocyanate or diisothiocyanate, ethylphenylene diisoocyanate, isopropyl phenylene diisocyanate or diisothiocyanate, dimethylphenylene diisocyanate or diisothiocyanate, diethylphenylene diisocyanate or diisothiocyanate, diisopropylphenylene diisocyanate or diisothiocyanate, trimethylbenzyl triisocyanate or triisothiocyanate, xylylene diisocyanate or diisothiocyanate, benzyl triiso(thio)cyanate, 4,4'-diphenyl methane diisocyanate or diisothiocyanate, naphtalene diisocyanate or diisothiocyanate, isophorone diisocyanate or diisothiocyanate, bis(isocyanate or diisothiocyanate methyl) cyclohexane, hexamethylene diisocyanate or diisothiocyanate and dicyclohexylmethane diisocyanate or diisothiocyanate.

There can be used a single polyisocyanate or isothiocyanate monomer or a mixture thereof.

The polythiol monomer may be any suitable polythiol having two or more, preferably two or three thiol functions.

The polythiol monomers can be represented by formula:

R'(SH)$_{n'}$ in which n' is an integer from 2 to 6 and preferably 2 to 3, and R' is an organic group of valency equal to n'.

Useful polythiol monomers are those disclosed in EP-A-394. 495 and U.S. Pat. No. 4,775,733 and the polythiols corresponding to the following formulas:

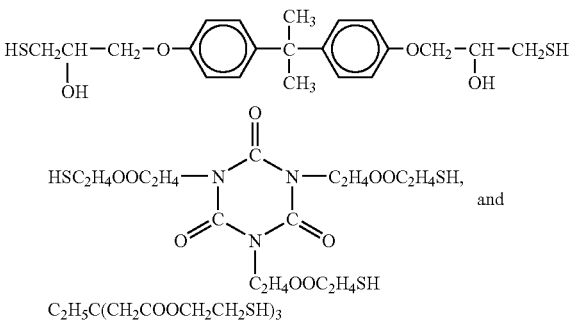

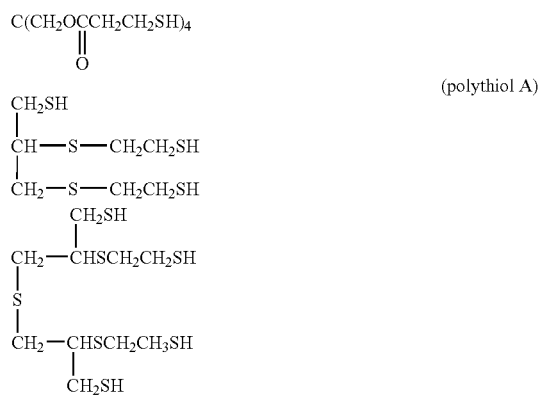

Among the preferred polythiol monomers there may be cited aliphatic polythiols such as pentaerythritol tetrakis mercaptoproprionate, 1-(1'mercaptoethylthio)-2,3-dimercaptopropane, 1-(2'-mercaptopropylthio)-2,3-dimercaptopropane, 1-(-3'mercaptopropylthio)-2,3-dimercaptopropane, 1-(-4'mercaptobutylthio)-2,3-dimercaptopropane, 1-(5'mercaptopentylthio)-2,3-dimercapto-propane, 1-(6'-mercaptohexylthio)-2,3-dimercaptopropane, 1,2-bis(4'-mercaptobutylthio)-3-mercaptopropane, 1,2-bis(-5'mercaptopentylthio)-3-mercaptopropane, 1,2-bis(-6'-mercaptohexyl)-3-mercaptopropane, 1,2,3-tris (mercaptomethylthio)propane, 1,2,3-tris(-3'-mercaptopropylthio)propane, 1,2,3-tris(-2'-mercaptoethylthio)propane, 1,2,3-tris(-4'-mercaptobutylthio)propane, 1,2,3-tris(-6'-mercaptohexylthio)propane, methanedithiol), 1,2-ethanedithiol, 1,1-propanedithiol, 1,2-propanedithiol, 1,3-propanedithiol, 2,2-propanedithiol, 1,6-hexanethiol-1,2,3-propanetrithiol, and 1,2-bis(-2'-mercaptoethylthio)-3-mercaptopropane.

The most preferred polythiols monomers are chosen between the group comprising (polythiol A)

The most preferred polythiol is 3-(2-sulfanylethylthio)-2-(2-sulfanylethylthio) propane-1-thiol (or 4-mercaptomethyl-3,6-dithia-1,8octanedithiol) (polythiol A).

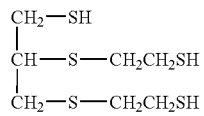

The preferred polythiourethanes are those obtained from diisocyanate monomers and polythiol monomers, and especially those from xylylenediisocyanate $C_6H_4(CH_2NCO)_2$ (XDI) and polythiol A.

In certain embodiments of the present methods, a catalyst such as dibutyl tin chloride from 0.001 to 0.500 per hundred parts by weight of polymerizable composition, or preferably from 0.010 to 0.050 per hundred parts by weight of polymerizable composition, may be used. Other additives such as ultra violet (UV) absorbers and internal releasing agent may be added to the polymerizable composition.

Preferably, the polymerizable composition is free of $NH_2$ functionalities.

The two part mold assembly into which the polymerizable composition may be poured comprises preferably two mold parts that are spaced by a peripheral gasket. The gasket may comprise a means for positioning and maintaining the polarized film in a predetermined position. Preferably, the means comprises an annular recess, such as groove, in the gasket where the periphery of the polyvinyl alcohol film is inserted.

Generally, when molding an optical article having a front convex lens surface, the polarizing polyvinyl alcohol film is positioned at a distance of 0.5 to 1 millimeters (mm) from the mold part that imparts the front lens surface.

The curing step that may used consistently with certain of the present processes is a thermal curing step that is preferably implemented over a period of more than 10 hours, and preferably more than 20 hours. A "thermal curing step" is defined as curing by heating the molding assembly with an outside heating source.

In certain embodiments, gelation of the polymerizable composition occurs after more than one hour of curing, preferably after 2 hours of curing, more preferably after 3 hours and even better after 4 hours. During the curing, a temperature above 90° C., and preferably above 100° C., may be achieved. The preferred maximum temperature is about 120° C.

In certain embodiments, the polyvinyl alcohol film is a naked polyvinyl alcohol film, meaning the polyvinyl alchol film is either a non composite film without a coating or film overlying it, or a polyvinyl alcohol film overlyed by a coating or a film on only one of its faces. An overlying film is a film that can be a supporting film for the polyvinyl alcohol film.

In embodiments of the present processes and articles, at least one naked face of polyvinyl alcohol will directly be in contact with the polymerizable (e.g., polythiourethane) composition.

The preferred polyvinyl alcohol film is a naked, free standing, polyvinyl alcohol film. Such films are commercially available from, for example, Opto-alpha, S-Tek and Tanaka companies, and have a typical thickness ranging from 0.01 to 0.05 mm. It also has been found that it is possible to dry a polyvinyl alcohol film in air, preferably at a temperature from 45° C. to 60° C., preferably 45° C. to 55° C. from 2 to 48 hours, without degrading its optical properties, and especially its polarizing properties. Such a dry film is preferably used with embodiments of the present processes.

The polyvinyl alcohol film is preferably preformed at a curvature that is close to the curvature of the final article (e.g., an optical lens) to be obtained, before being positioned in the mold assembly.

It is surprising that, using certain of the present processes, one can obtain very good adhesion between a naked polyvinyl alcohol film and a polythiourethane polymer (e.g., one of the present polymerizable compositions) without any primer coating or adhesive coating.

The following examples are included to demonstrate specific, non-limiting embodiments of the present processes and articles. It should be appreciated by those of ordinary skill in the art that the following techniques have been used to carry out certain of the present processes and yielded certain of the present articles. However, those of ordinary skill in the art should, in light of this disclosure, appreciate that changes can be made to the techniques and materials of the following examples and still obtain like or similar results.

EXAMPLES

The polymerizable composition that was used in the examples is monomer formulation 1 described below. The ratios are given by weight.

Monomer Formulation 1:

| Item | Amount | Name |
|---|---|---|
| 1 | 52.15% | m-xylenediisocyanate |
| 2 | 47.85% | 4-mercaptomethyl-3,6-dithia-1,8-octanedithiol |
| 3 | 0.1125[1] | di-n-butyltindichloride, an effective amount of a UV absorber, and an internal release agent |

[1] total weight of the 3 compounds (catalyst, UV absorber and internal release agent) expressed in parts by weight per hundred parts of total monomer (phm) amount (polyisocyanate + polythiol). Amount of di-n-butyltindichloride is about 0.01 phm.

The General Procedure

Lens mold assemblies that included 2 lens mold parts set apart by a gasket having an internal annular groove for positioning the polarizing film were prepared, and Opto-alpha (OA) PVOH films or Tanaka (Tan) films were positioned inside the molding cavity. The monomer composition (Formulation 1 above) was then added in the mold, and the lens was hardened by curing from 10° C., preferably 20° C. to 100° C. or 120° C. (the temperature being increased regularly during a period of about 38 hours).

The lenses were then cooled to reach ambient temperature and de-molded. The lenses were then inspected by visual inspection. The conditions of the film drying, the maximum temperature achieved during curing, and the results of the processes are provided in the following tables.

TABLE 1

| | | | Cure of the Polymer | |
| Lens | Film | Dry | Composition | Bubbles |
|---|---|---|---|---|
| Comparative 1 | OA | none | 120° C.* | many at ~1 mm |

*final temperature achieved at the end of the curing.

TABLE 2

Dry 3 Hours at 70° C., Cure to 100° C.

| Lens | Film | Bubbles |
|---|---|---|
| 1 | OA | No; film diameter is good |
| 2 | OA | No; film diameter is good |
| 3 | Tanaka | No; film diameter shrank and wrinkled |
| reference | none | No |

TABLE 3

Dry 2 Hours at 65° C., Cure to 100° C.

| Lens | Film | Bubbles |
|------|------|---------|
| 4 | Tanaka | No |
| 5 | Tanaka | No |
| reference | none | No |

It was found that drying at 65° C. was suitable to eliminate bubbles using either Tanaka or Opto-alpha films. A control, with no film, was used to ensure the polymer itself was free of bubbles.

A lower drying temperature of 55° C., believed to be just below the Tg (glass transition temperature) or near the onset of Tg of the polyvinyl alcohol film, can completely insure film shape retention. It appears that this is the lower limit of the drying temperature range in that a few bubbles still remained.

TABLE 4

Dry 28 Hours at 55° C., Cure to 120° C.

| Lens | Film | Bubbles |
|------|------|---------|
| 6 | OA | 1 - very small |
| 7 | OA | No |
| 8 | OA | No |
| 9 | OA | 1 - very small |
| reference | none | No |

Adhesion

The above-casted lenses were cut into ⅛" strips and then snapped and the film was checked for adhesion to the substrate. Excellent adhesion resulted for all samples tested.

Effect of the Drying on the PVOH Films

Film color and polarization properties are the result of aligned iodine molecules or other dichroic species. Volatilization or migration of these species can reduce the effectiveness of the polarizer.

To further evaluate drying on the polarizer, films were measured, dried, then re-measured. Surprisingly, no color change was seen.

Besides, a measurement made with a Lamda 900 spectrometer (PerkinElmer, Inc.) confirms that polarization is maintained after a 24 hour period of drying at 55° C. with no loss of Q-ratio. Q-ratio is defined as the ratio of light transmission through a parallel cross-polarizer $T//$(large value) divided by light transmission $T^{\perp}$ through a perpendicular cross-polarizer (small value):

Q-ratio=% $T//$

% $T^{\perp}$

The larger the value, the more highly polarized it is.

From the table below, it can be seen that drying for 24 hrs at 55° C. of Opto-alpha grey PVOH film does no diminish the polarization properties. Colorimetric properties are measured in the CIE La*b* system.

| | L | a* | b* | % T | Q-ratio |
|---|---|---|---|---|---|
| Initial | 66.9 | 0.81 | −0.61 | 36.5 | 1236 |
| After drying 24 hrs at 55° C. | 66.7 | 0.95 | −0.72 | 36.2 | 1221 |

It should be understood that the present processes and articles are not intended to be limited to the particular forms disclosed. Rather, they are to cover all modifications, equivalents, and alternatives falling within the scope of the claims.

The invention claimed is:

1. A process for obtaining a polythiourethane polarized article comprising:
    positioning a polarized polyvinyl alcohol film in a molding cavity of a two part mold assembly;
    pouring in the molding cavity a polymerizable composition comprising:
        (a) at least one poly(iso)thiocyanate monomer and at least one polythiol; or
        (b) a mixture of at least one liquid NCO- or NCS-terminated poly(thio)urethane prepolymer and at least one liquid SH-terminated poly(thio)urethane prepolymer;
    curing the polymerizable composition; and
    removing the polythiourethane polarized article from the molding cavity,
    wherein the polarized polyvinyl alcohol film has been dried at a temperature ranging from 25° C. to 100° C. before pouring the polymerizable composition in the molding cavity.

2. The process of claim 1, where the polymerizable composition is free of $NH_2$ functionalities.

3. The process of claim 1, where the two part mold assembly comprises two mold parts spaced apart by a peripheral gasket, where the gasket includes means for positioning and maintaining the polarized polyvinyl alcohol film in a predetermined position.

4. The process of claim 1, where the polarized polyvinyl alcohol film is a single layer of polyvinyl alcohol.

5. The process of claim 1, where the polarized polyvinyl alcohol film has been dried at a temperature ranging from 45° C. to 60° C. before pouring the polymerizable composition in the molding cavity.

6. The process of claim 1, wherein the polarized polyvinyl alcohol film has been dried at a temperature ranging from 45° C. to 100° C. before pouring the polymerizable composition in the molding cavity.

7. The process of claim 1, where the polyvinyl alcohol film is a naked polyvinyl alcohol film.

8. The process of claim 7, where the polyvinyl alcohol film is a non-composite film without a coating or film overlying it.

9. The process of claim 1, wherein the thickness of the polyvinyl alcohol film ranges from 0.01 to 0.05 mm.

10. The process of claim 1, wherein the polymerizable composition comprises xylylenediisocyanate and 4-mercaptomethyl-3,6-dithia-1,8-octanedithiol.

11. A process for obtaining a polarized article comprising:
    positioning a polarized polyvinyl alcohol film in a molding cavity of a two part mold assembly;
    pouring in the molding cavity a polymerizable composition comprising:
        (a) at least one poly(iso)thiocyanate monomer and at least one polythiol; or
        (b) a mixture of at least one liquid NCO- or NCS-terminated poly(thio)urethane prepolymer and at least one liquid SH-terminated poly(thio)urethane prepolymer; and
    curing the polymerizable composition to yield the polarized article,
    wherein the polarized polyvinyl alcohol film adheres to the cured polymerizable composition, and
    wherein the polarized polyvinyl alcohol film has been dried at a temperature ranging from 25° C. to 100° C. before pouring the polymerizable composition in the molding cavity.

12. The process of claim 11, where the polymerizable composition is free of $NH_2$ functionalities.

13. The process of claim 11, where the two part mold assembly comprises two mold parts spaced apart by a peripheral gasket.

14. The process of claim 13, where the peripheral gasket includes an annular recess in which the periphery of the polyvinyl alcohol film is inserted.

15. The process of claim 11, where the polarized polyvinyl alcohol film is a single layer of polyvinyl alcohol.

16. The process of claim 11, where the polarized polyvinyl alcohol film has been dried at a temperature ranging from 45° C. to 60° C. before pouring the polymerizable composition in the molding cavity.

17. The process of claim 11, wherein the polarized polyvinyl alcohol film has been dried at a temperature ranging from 45° C. to 100° C. before pouring the polymerizable composition in the molding cavity.

18. The process of claim 11, wherein the thickness of the polyvinyl alcohol film ranges from 0.01 to 0.05 mm.

19. A polarized article comprising a polythiourethane substrate and a naked polarized polyvinyl alcohol film directly adhering to said polythiourethane substrate, wherein said polarized article is obtained by:

positioning a polarized polyvinyl alcohol film in a molding cavity of a two part mold assembly;

pouring in the molding cavity a polymerizable composition comprising:
(a) at least one poly(iso)thiocyanate monomer and at least one polythiol; or
(b) a mixture of at least one liquid NCO- or NCS-terminated poly(thio)urethane prepolymer and at least one liquid SH-terminated poly(thio)urethane prepolymer;

curing the polymerizable composition to yield a polythiourethane substrate adhering to the polarized polyvinyl alcohol film, and wherein the polarized polyvinyl alcohol film has been dried at a temperature ranging from 25° C. to 100° C. before pouring the polymerizable composition in the molding cavity.

20. The article of claim 19, where the naked polyvinyl alcohol film is embedded between two layers of polythiourethane.

21. The article of claim 19, further defined as an optical lens.

22. The article of claim 19, wherein the thickness of the polyvinyl alcohol film ranges from 0.01 to 0.05 mm.

* * * * *